(12) United States Patent
Murphy et al.

(10) Patent No.: US 6,317,286 B1
(45) Date of Patent: Nov. 13, 2001

(54) DIAPHRAGM-SEALED DISC DRIVE

(75) Inventors: James Morgan Murphy, Boulder; Paul Allison Beatty; Serge Jacques Fayeulle, both of Longmont, all of CO (US); Zine-Edine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/490,602

(22) Filed: Jan. 25, 2000

Related U.S. Application Data
(60) Provisional application No. 60/117,867, filed on Jan. 29, 1999.

(51) Int. Cl.$^7$ ................................................ G11B 33/14
(52) U.S. Cl. ....................................................... 360/97.02
(58) Field of Search ........................ 360/97.02, 97.03, 360/97.01, 98.01; 95/14, 15

(56) References Cited

U.S. PATENT DOCUMENTS

| | | | |
|---|---|---|---|
| 3,882,473 | 5/1975 | Hoehmann | 360/98 |
| 4,620,248 | 10/1986 | Gitzendanner | 360/97 |
| 4,684,510 | 8/1987 | Harkins | 423/210 |
| 5,075,807 | 12/1991 | Inoue et al. | 360/97.02 |
| 5,193,046 | 3/1993 | Lemke et al. | 360/97.02 |
| 5,454,157 | * 10/1995 | Ananth et al. | 29/603 |
| 5,606,341 | 2/1997 | Aguilera | 345/87 |
| 5,709,289 | 1/1998 | Petet et al. | 188/298 |
| 6,088,190 | * 7/2000 | Anderson | 360/97.023 |

* cited by examiner

Primary Examiner—David Davis
Assistant Examiner—Angel Castro
(74) Attorney, Agent, or Firm—John R. Wahl; Merchant & Gould

(57) ABSTRACT

An apparatus for minimizing corrosion product build-up within a disc drive incorporates a non-corrosive gas hermetically sealed within the disc drive and a diaphragm chamber that allows the constrained non-corrosive gas to respond to changes in pressure and temperature. The diaphragm chamber includes a diaphragm that partitions the diaphragm chamber into a top and bottom chambers. The top chamber has an aperture for communicating with the external environment and the bottom chamber has an aperture for communicating with the internally constrained non-corrosive gas. The diaphragm is non-permeable and made of an elastic material that responds to changes in air volume or mass on either side of the partition so that the pressure inside the hermetically sealed disc drive is constant throughout the life of the device. The diaphragm chamber can be located inside or outside the disc drive and can be integrally formed within the top cover of the disc drive.

20 Claims, 4 Drawing Sheets

DIAPHRAGM-SEALED DISC DRIVE

RELATED APPLICATIONS

This application claims the benefit of priority of U.S. Provisional Patent Application Serial No. 60/117,867 entitled "ANTI-CORROSION DIAPHRAGM-SEALED DISK DRIVE," filed Jan. 29, 1999.

FIELD OF THE INVENTION

This application relates to magnetic disc drives and more particularly to a diaphragm-sealed disc drive having increased corrosion resistance.

BACKGROUND OF THE INVENTION

Disc drives are data storage devices that store digital data in magnetic form on a rotating storage medium on an information storage disc. Modern disc drives comprise one or more rigid information storage discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads in an arc across the surface of the discs. Each of the concentric tracks is generally divided into a plurality of separately addressable data sectors. The recording transducer, e.g. a magnetoresistive read/write head, is used to transfer data between a desired track and an external environment. During a write operation, data is written onto the disc track and during a read operation the head senses the data previously written on the disc track and transfers the information to a host computing system. The overall capacity of the disc drive to store information is dependent upon the disc drive recording density. It is of particular importance in the disc drive art to maximize the disc drive recording density.

One of the most important parameters affecting the recording density of a disc drive is the spacing between the head and the magnetizable medium layer of the information storage disc, this spacing is known as the head media spacing. Closer head to media spacing allows for smaller magnetic signals, i.e., bits, recorded on the information storage disc which in turn allows for narrower track widths and consequent greater recording densities on the drive. As such, one way to maximize the disc drive recording density is to minimize head media spacing.

Head media spacing is dependent upon several factors, including: the head's "flying height," i.e., the physical separation distance between the top of the disc and the bottom of the recording head, the thickness of a lubricant layer, the thickness of a protective overcoat layer located on top of the magnetizable layer on the information storage disc, the thickness of a protective overcoat layer located on the air bearing surface of the head and the "any distance" that the recording transducers' pole tips are recessed below the level of the air bearing surface of the head.

Currently, efforts in the disc drive art have been centered on, among other things, decreasing the head media spacing by minimizing the thickness of the protective overcoat layers on the information storage disc and head. One major limiting factor on decreasing the protective overcoat layer thickness is the ability of the overcoat layer to protect the information storage disc and head from the build-up of corrosion products.

Corrosion causes corrosion products to build-up on the disc and head during the normal operating life of the drive. Corrosion products tend to accumulate on surfaces and interfere with the head's ability to fly over the disc surface. Corrosion occurs in the disc drive due to metals' propensity to be oxidized in the presence of oxygen or other oxidizing agents. The protective overcoat layer found on the information storage disc and head limits corrosion by eliminating the contact between the metal surfaces of the information storage disc and head with oxygen or other oxidizing agents found in the air.

It is also possible to limit corrosive product build-up on the disc and head by limiting the availability of oxygen within the disc drive. Here, the oxygen containing air within the disc drive can be replaced with a non-corrosive gas such as argon. The disc drive is then hermetically sealed so as to maintain a non-corrosive environment for the disc drive metal components. Within this non-corrosive environment the protective overcoat layers may be minimized in thickness, or in certain circumstances removed.

A major shortcoming of oxygen replacement within the drive is that the constrained non-corrosive gas within the hermetically sealed disc drive is unable to respond, i.e., expand or contract, to external changes in pressure or temperature. As is well known in the art, the volume of a gas is dependent upon its temperature and pressure. In general, a gasses volume is inversely proportional to the pressure applied to it and directly proportional to its temperature. For example, under ideal conditions an atmospheric pressure change from 101.3 kPa at sea level to 69.6 kPa at an altitude of 10,000 feet produces a volume increase of approximately 43% for an unconstrained constant mass of gas. The volume increase inside the disc drive results in increased pressure and has consequent affects on the alignment of components within the drive and potential failure of the seals within the drive. Against this backdrop the present invention has been developed.

SUMMARY OF THE INVENTION

In accordance with the present invention the above problems and other problems have been solved by incorporating a gas constrained within a diaphragm-sealed disc drive.

In accordance with one embodiment of the present invention, a disc drive includes a hermetically sealed housing having a baseplate. A gas is constrained within the hermetically sealed housing. A spin motor is mounted to the housing baseplate for rotating an information storage disc. An actuator assembly is also mounted to the baseplate, the actuator assembly swings an actuator arm, carrying a read/write head, over the information storage disc. Additionally, the disc drive includes a diaphragm chamber having a first portion that accommodates changes in the volume of the constrained gas. The first portion defines an aperture that provides an air passage between the disc drive's external environment and the first portion. A diaphragm hermetically seals the diaphragm chamber's first portion from the internally constrained gas within the disc drive. Further, the diaphragm responds to the gasses volume changes within the hermetically sealed disc drive.

The present invention may also be implemented as a disc drive diaphragm chamber having a constrained gas for reducing the effects of corrosion product build-up within the disc drive. A first portion of the diaphragm chamber is positioned in the disc drive to accommodate changes in the volume of the constrained gas, while a first aperture provides an air passage between the disc drive's external environment and the first portion. A diaphragm seals the first portion from the constrained gas as well as responds to volumetric changes of the constrained gas.

Utilizing the diaphragm-sealed disc drive will allow for a minimization of the protective overcoat layers on the information storage disc and head and potentially an increase in the disc drive's recording density. Additional benefits of the present invention include: (1) reduced non-repeatable run-out caused by windage excitation, i.e., disc flutter, when the constrained gas has a lower density than air, e.g., helium, hydrogen, etc.; (2) reduced power dissipation by the disc drive due to decreased air resistance when the constrained gas has a lower density than air; and (3) reduced wear on the disc drive components in general, as a result of the fact that many tribochemcial wear reactions require oxygen and other oxidizing agents not found in the constrained gas.

These and various other features as well as advantages which characterize the present invention will be apparent from a reading of the following detailed description and a review of the associated drawings.

DETAILED DESCRIPTION

Figure 1:
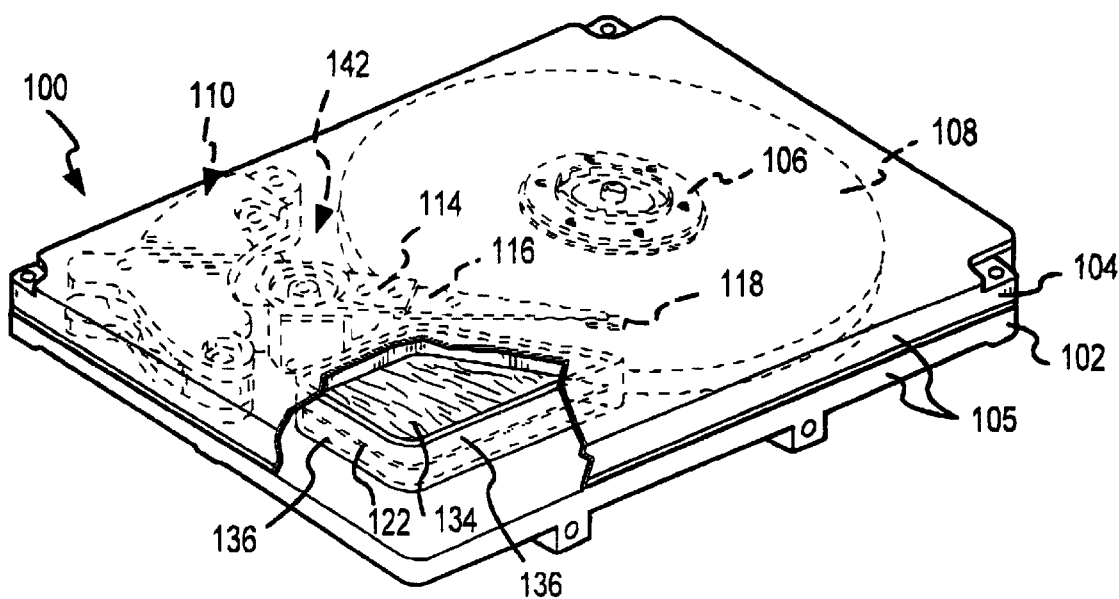
FIG. 1 shows a disc drive incorporating a diaphragm chamber and diaphragm in accordance with a preferred embodiment of the present invention.

A disc drive 100 constructed in accordance with one preferred embodiment of the present invention is shown in FIG. 1. The disc drive 100 includes a base plate 102 to which various structural components of the disc drive 100 are mounted. A top cover 104 cooperates with the base 102 to form a disc drive housing 105. The housing 105 forms an internal, sealed environment for the disc drive in a conventional manner. The disc drive components include a spindle motor 106 which rotates one or more information storage discs 108 at a constant high speed. Information is written to and read from tracks on the information storage discs 108 through the use of an actuator assembly 110, which rotates or swings about a bearing shaft assembly positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider 120 (FIG. 2) enabling the head 118 to fly in close proximity above the corresponding surface of the associated information storage disc 108. Finally, a diaphragm chamber 122 in accordance with one preferred embodiment of the present invention is positioned adjacent the actuator assembly 110.

The spacing of the head 118 in relation to the recording media 124 of the information storage disc 108, i.e., the head media spacing 126, is a critical parameter to the amount of information an information storage disc 108 is able to store. (see FIG. 2) Relative close proximity between the head 118 and information storage disc 108 allows for smaller bits, i.e., magnetic signals, and thus narrower track widths on the discs 108. Narrower track widths result in more tracks per disc and hence a higher disc drive recording density. Alternatively, relatively larger distances between the head and the information storage disc results in fewer tracks being recordable on the disc and hence a lower disc drive recording density.

Figure 2:
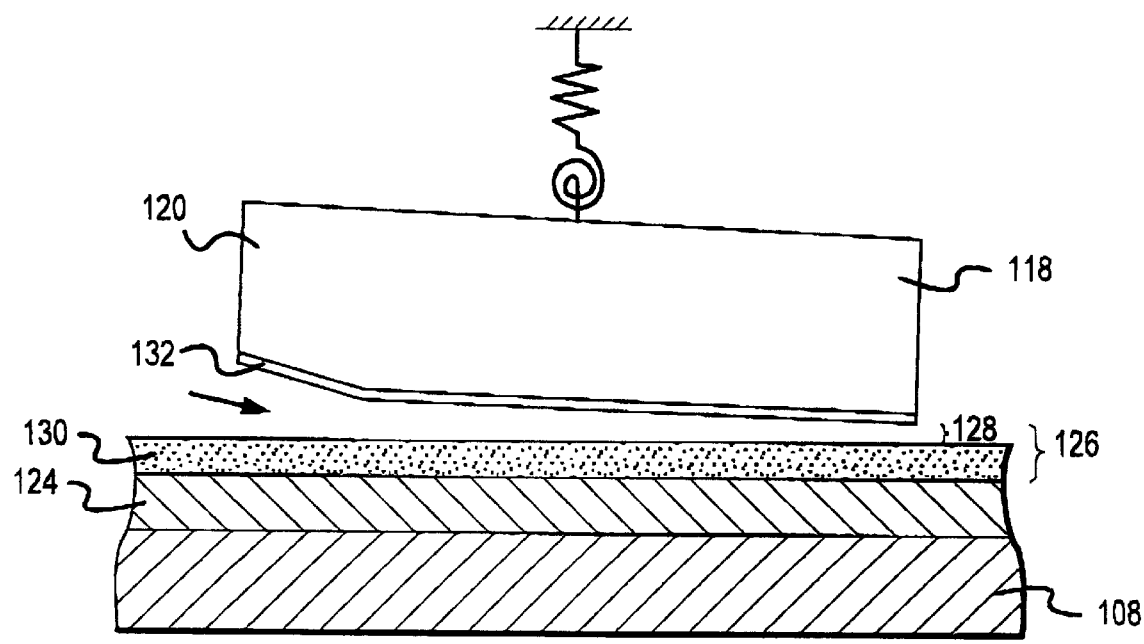
FIG. 2 is a representative sectional view of a head-disc interface illustrating a head media spacing showing a head flying height, a lubricant, a protective overcoat layer for the information storage disc and a protective overcoat layer for the head.

FIG. 2 is a representative sectional view of a head 118 positioned over an information storage disc 108 showing the head media spacing 126. The head media spacing 126 includes the head flying height 128, a lubricant layer (not shown), a corrosion and wear protective overcoat layer 130 for the information storage disc 108 and a corrosion and wear protective overcoat layer 132 for the head 118. Conventionally, the flying height 128 of the head 118 may be anywhere from 15–30 nm in thickness, the lubricant layer 1–2 nm in thickness, the protective overcoat layer 130 for the information storage disc 108 5–10 nm in thickness and the protective overcoat layer 132 for the air bearing surface of the head 118 5–7 nm in thickness. Thus, the total head media spacing 126 in any one disc drive 100 typically varies between 26–49 nm. Of that 26–49 nm of head media spacing 126, 10–17 nm of spacing result from the two protective overcoat layers 130 and 132, one found on the information storage disc and the other on the head. The present invention is concentrated on limiting, and possibly eliminating, the need for having the 10–17 nm spacing 126 dedicated to the two protective layers 130 and 132 by providing an alternative mechanism for corrosion resistance. In the absence of the two protective layers 130 and 132 the head 118 potentially could be positioned in the range of 16–32 nm from the information storage disc recording layer 124. It should be understood that the numerical spacing distances used above are merely for illustrative purposes and are not meant to define the scope of the present invention. It can be expected that these distances will change in future disc drives.

Figure 3:
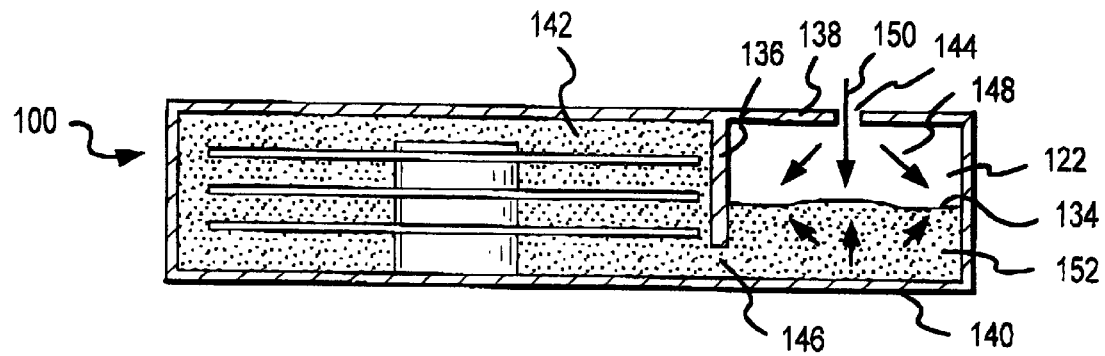
FIG. 3 is a schematic sectional view taken along 3—3 of FIG. 1 under normal disc drive operating conditions.
Figure 4:
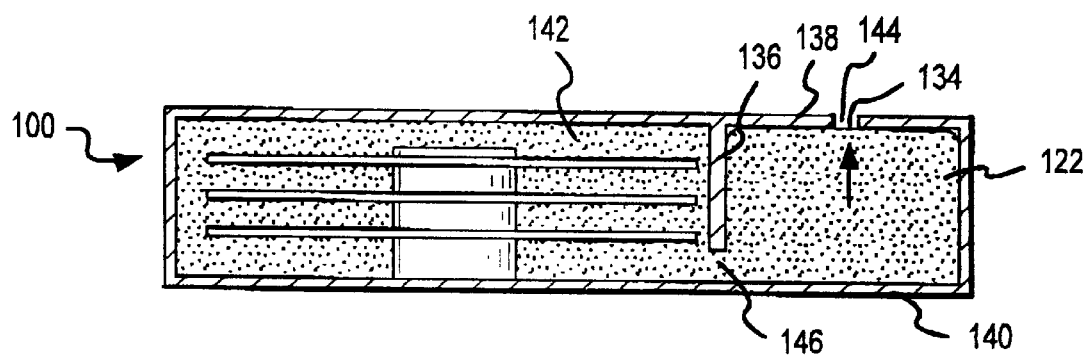
FIG. 4 is a schematic sectional view taken along 3—3 of FIG. 1 when the disc drive is exposed to relatively low external air pressure and/or high temperature with respect to the constrained non-corrosive gas.
Figure 5:
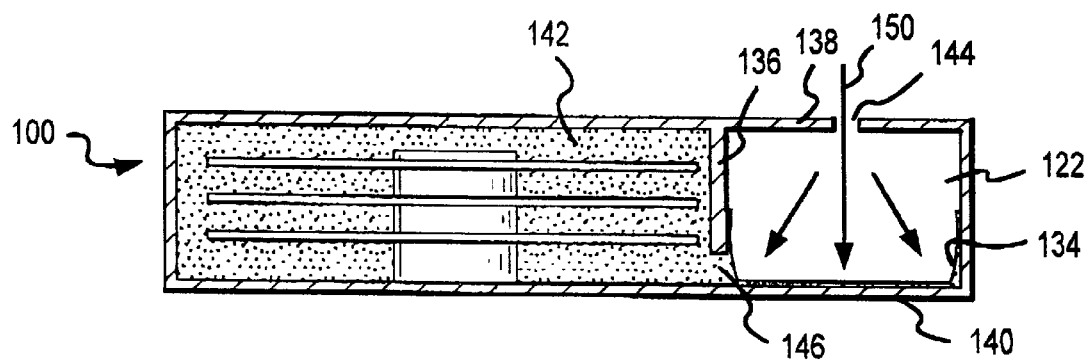
FIG. 5 a schematic sectional view taken along 3—3 of FIG. 1 when the disc drive is exposed to relatively high external air pressure and/or low temperature with respect to the constrained non-corrosive gas.

One preferred embodiment of the present invention is shown in top view in FIG. 1 and cross-sectional schematic views in FIGS. 3–5. A diaphragm chamber 122 having a diaphragm 134 positioned within it is located adjacent the actuator assembly 110. The diaphragm chamber 122 itself is generally a box shaped structure having four sides 136, a top 138 and a bottom 140. The top 138 of the diaphragm chamber 122 is simply the top cover 104. Extending downward from the top cover or top 104 are four sides 136 of relative equal length and width, each forming one side of the box like structure. Preferably, two of the sides 136 are positioned to border the internal environment 142 of the disc drive 100. The bottom 140 of the chamber 122 combines the fours sides 136 together and completes the compartment. The bottom 140 of the compartment can be a separate wall constructed specifically for the chamber or can be a region of the base plate 102.

Two apertures 144 and 146 are formed in the diaphragm chamber 122, the first aperture 144 is formed through the top 138 of the chamber 122. The second aperture 146 is formed through one of the two sides 136 that borders the internal environment 142 of the disc drive 100. Each aperture 144 and 146 should be of a size and shape to freely allow airflow into and out of the chamber 122.

A flexible diaphragm 134 or partition extends across the interior of the diaphragm chamber 122. The flexible diaphragm 134 separates the diaphragm chamber 122 into a first portion 148, that communicates through the aperture 144 formed in the top 138 with the disc drive's external environment 150, and a second portion 152, that communicates through the aperture 146 formed in one of the diaphragm chamber's 122 internal facing sides 136 with the disc drive's internal environment 142. The flexible diaphragm 134 is sealed to the diaphragm chamber sides 136 by adhesive or other attachment means so that the two portions 148 and 152 are hermetically sealed from each other by the diaphragm 134. The diaphragm 134 is positioned approximately half way between the two apertures 144 and 146 so as to create substantially two equally sized portions 148 and 152. However, the diaphragm 134 may be positioned anywhere within the chamber 122 as long as it partitions the disc drive's external environment 150 from the disc drive's internal environment 142.

The diaphragm 134 itself is preferably a flexible or elastic material, responsive to small changes in pressure, on the order of a kPa, and having low propensities for outgassing. Additionally, the diaphragm is substantially non-permeable to air. A thin metal coating can be added to the diaphragm to help prevent gas diffusion. An example of one such diaphragm material is a polyester film, such as Mylar™.

Potential non-corrosive gases for use inside the disc drive 100 include: argon, hydrogen, helium, nitrogen, fluorocarbon and hydrocarbon. Oxygen, water vapor and acid gases (e.g., nitric oxide) are specifically excluded from the internal environment of the drive. It is also envisioned that a chemically-reactive oxygen-scavenging material, "getter," could also be included within the disc drive. The oxygen-scavenger would remove oxygen that infiltrates the drive during the disc drive's manufacture or due to subsequent disc drive leaks. Examples of such "getter" materials include magnesium and copper.

FIG. 3 shows a disc drive 100 where the air pressure and temperature of the external air and internal non-corrosive gas are approximately the same. The diaphragm 134 maintains a non-stressed position within the chamber 122 due to the unchanged volume of the non-corrosive gas. FIG. 4 shows a disc drive 100 where the external air pressure is lower than the non-corrosive gas pressure or, alternatively, where the external air temperature is greater than the internal non-corrosive gas temperature. In either case, the non-corrosive gas expands in volume to respond to the change in pressure and temperature and exerts pressure on the flexible diaphragm 134. The diaphragm 134 flexes or expands into the first portion 148 to accommodate the increased gas volume—thus keeping the pressure relatively constant within the disc drive 100. FIG. 5 shows a disc drive 100 where the external air pressure is greater than the internal non-corrosive gas pressure or, alternatively, where the air temperature is lower than the internal non-corrosive gas temperature. In these cases, the diaphragm 134 flexes or expands into the second portion 152 to accommodate the decreased volume—thus keeping the pressure relatively constant within the disc drive 100.

Figure 6:
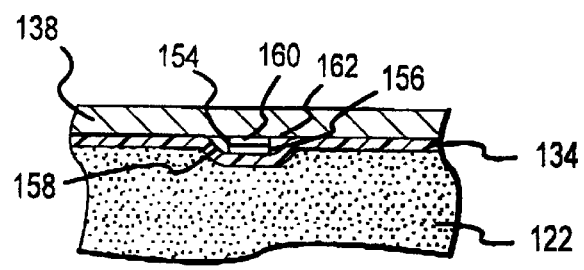
FIG. 6 is a representative sectional view of a disc drive incorporating a diaphragm chamber having an environmental protection switch in accordance with one preferred embodiment of the present invention.

Another preferred embodiment of the flexible diaphragm is shown in FIG. 6. Here, an environmental protection switch 154 is placed within the diaphragm chamber 122 to alert the user when external conditions, i.e., temperature and altitude, have caused the diaphragm 134 to flex to a predetermined position or threshold. An electrical contact 156 is adhered to the top side 158 of the diaphragm 134. A second electrical contact 160 is adhered to the bottom side 162 of the top 138 of the chamber 122. The two electrical contacts 156 and 160 are aligned so that at a predetermined expansion of the diaphragm 134, the two contacts 156 and 160 will meet and complete an electrical circuit. Any number of signals could be tripped when the circuit is connected: flashing light, audio alarm, etc. It is further envisioned that a like switch could be arranged with electrical contacts on the bottom side of the diaphragm and top side of the bottom of the diaphragm chamber.

Figure 7:
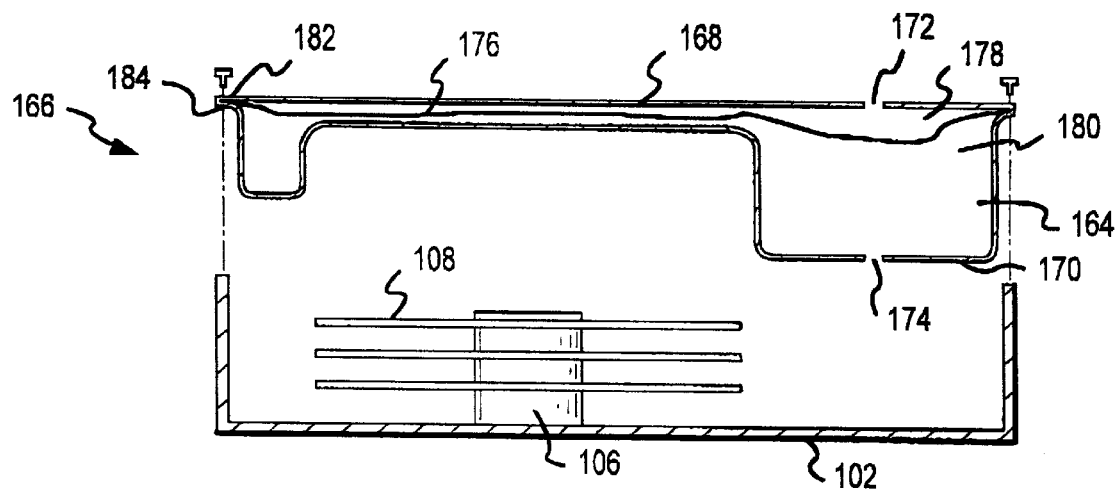
FIG. 7 is a representative sectional view of a disc drive incorporating a diaphragm chamber in accordance with a second preferred embodiment of the present invention.

FIG. 7 is a sectional view through another preferred embodiment of the present invention. In this embodiment the diaphragm chamber 164 is formed within a two-piece stamped aluminum top cover 166. The top stamping 168 of the top cover 166 is the same shape and size as conventional disc drive top covers 104 (see FIG. 1). A bottom stamping 170 of the top cover 166 defines the bottom surface of the diaphragm chamber 164. The bottom stamping 170 would be of a shape and size to contour along the disc drive components. The area between the top and bottom stampings 168 and 170 respectively forms the diaphragm chamber 164. Aperture 172 is formed in the top stamping 168 and aperture 174 is formed in the bottom stamping 170. The apertures 172 and 174 must be of a size and shape to freely allow airflow into and out of the chamber 164.

A flexible diaphragm 176 partitions the diaphragm chamber 164 into two compartments a top and a bottom compartment 178 and 180 respectively. The diaphragm 176 could be sealed in the chamber 164 with an adhesive or other attachment means. Alternatively, the diaphragm 176 could be fit between a peripheral flange (not shown) defined along a peripheral edge 182 of the top stamping 168 and along a peripheral flange (not shown) defined along a peripheral edge 184 of the bottom stamping 170. The diaphragm 176 is positioned between the top and bottom stamping flanges (not shown) and the flanges are sealed together by heat, pressure or adhesive. It is also noted that a non-continuous diaphragm could be positioned within the two-piece top cover 166 as long as each diaphragm segment sealed off a portion of the bottom chamber and each portion of the bottom chamber has an aperture for communication with the internally constrained gas.

As can be seen from a comparison between FIG. 1 and FIG. 6, the diaphragm chamber 164 in FIG. 7 provides a greater volume to accommodate potential non-corrosive gas expansion or contraction. Preferably, as much as possible of the unoccupied space within the disc drive 100 is utilized for the diaphragm chamber 122 and 164. Thus, dependent on the drive configuration, number of discs within the drive and diameter of the discs, the chamber should be designed to maximize chamber volume. For example, it is estimated that the diaphragm chamber 122 embodiment shown in FIG. 1, positioned in a Bali-4 disc drive, would have a volume of approximately 33 $cm^3$. This compares to a total disc drive internal air volume of approximately 112 $cm^3$. As such, this chamber 122 volume would be sufficient to allow for a roughly 35% overall change in internal gas volume.

Other diaphragm chamber designs are contemplated to be within the scope of the present invention. For example, the diaphragm chamber could be built into the base plate with the diaphragm partitioning the two chambers so that one of the two chambers communicates with the external environment through an aperture formed in the base plate.

Additionally, since the chambers function to accommodate changes in gas volume, the chambers can have any number of sides or different shapes as long as the chamber fits within the configuration of the drive. In fact, the chamber could be formed in the absence of a bottom as long as the diaphragm sealed the external environment from the internally constrained non-corrosive gas. It is further envisioned that multiple diaphragm chambers could be positioned within the disc drive, positioned wherever the disc drive has unoccupied space. Alternatively, the chamber or chambers could be separate structures built on the exterior housing of the disc drive as long as they function to accommodate the expansion or compression of the constrained non-corrosive gas and do not interfere with the functioning of the disc drive. Finally, it should be understood that a diaphragm covered opening in the disc drive could be sufficient to allow the constrained internal gas to expand and/or contract in accordance with the present invention and is thus also within the present invention's scope.

In summary, a preferred embodiment of the invention described herein is directed to a hermetically sealed disc drive (such as 100) responsive to volumetric changes in an internally constrained gas. The disc drive includes a hermetically sealed housing (such as 105) that constrains a gas, the housing (such as 105) further defines a baseplate (such as 102). A spin motor (such as 106) is mounted to the baseplate (such as 102) to rotate an information storage disc (such as 108). An actuator assembly (such as 110) is also mounted to the baseplate (such as 102) to swing an actuator arm (such as 114), carrying a read/write head (such as 118), over the information storage disc (such as 108). Additionally, the disc drive (such as 100) includes a diaphragm chamber (such as 122) for responding to changes in the internally constrained gas volume. The diaphragm chamber (such as 122) includes a first portion (such as 148) that accommodates changes in the volume of the constrained gas, a first aperture (such as 144) that provides an air passage between the disc drive's external environment (such as 150) and the first portion (such as 148), and a diaphragm (such as 134) that hermetically seals the first portion (such as 148) of the diaphragm chamber (such as 122) from the constrained gas. The disc drive (such as 100) may also include a second diaphragm chamber (such as 122) for responding to changes in the volume of the constrained gas.

In another preferred embodiment of the present invention, an environmental protection switch (such as 154) is operatively engaged by the diaphragm (such as 134) to cause a signal when the diaphragm (such as 134) has flexed a predetermined amount.

In another preferred embodiment of the present invention, the constrained gas within the disc drive (such as 100) is non-corrosive. The gas may be argon, nitrogen, hydrogen, helium, a fluorocarbon or a hydrocarbon. Additionally, an oxygen scavenger, like magnesium or copper, may be included with the constrained gas.

In another preferred embodiment of the present invention, the diaphragm (such as 134) is a polyester film and can have a thin metal coating.

In another preferred embodiment of the present invention, the diaphragm chamber includes a second portion (such as 152) that is separated from the first portion (such as 148) by the diaphragm (such as 134). A second aperture (such as 146) is positioned in the second portion (such as 152) to provide an air passage between the disc drive's internally constrained gas and the second portion (such as 152).

In yet another preferred embodiment of the present invention, the diaphragm chamber (such as 164) is housed between a top stamping (such as 168) and a bottom stamping (such as 170) of the top cover (such as 166). A first aperture (such as 172) may be positioned through the top stamping (such as 168) and a second aperture (such as 174) may be positioned through the bottom stamping (such as 170).

A further exemplary preferred embodiment of the present invention includes a diaphragm chamber (such as 122) for responding to internal changes in gas volume in a hermetically sealed disc drive (such as 100). The diaphragm chamber (such as 122) includes a constrained gas for reducing the effects of corrosion build-up within the disc drive (such as 100). Additionally, the diaphragm chamber includes a first portion (such as 148) that accommodates changes in the volume of the constrained gas and a first aperture (such as 144) that provides an air passage between the disc drive's external environment (such as 150) and the first portion (such as 148). A diaphragm (such as 134) seals the first portion (such as 148) from the constrained gas and is able to respond to volumetric changes in the disc drive's constrained gas.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art Accordingly, all such modifications, changes and alternatives are encompassed in the spirit of the invention disclosed and as defined in the appended claims.

What is claimed is:

1. A hermetically sealed disc drive that is responsive to changes in gas volume, the disc drive comprising:
   a hermetically sealed housing constraining a gas, the housing including a baseplate;
   a spin motor mounted to the baseplate rotating an information storage disc;
   an actuator assembly mounted on the baseplate swinging an actuator arm, carrying a read/write head, over the information storage disc; and
   a diaphragm chamber for responding to changes in gas volume, the diaphragm chamber comprising:
   a first portion positioned in the disc drive accommodating changes in the volume of the constrained gas;
   a first aperture providing an air passage between the disc drive's external environment and the first portion; and
   a flexible diaphragm hermetically sealing the first portion from the constrained gas, wherein the diaphragm responds to changes in the volume of the constrained gas within the hermetically sealed disc drive.

2. The disc drive of claim 1, further comprising a second diaphragm chamber for responding to changes in the volume of the constrained gas.

3. The disc drive of claim 1, further comprising an environmental protection switch operatively engaged by the diaphragm to cause a signal when the diaphragm has flexed a predetermined amount.

4. The disc drive of claim 1, wherein the constrained gas within the disc drive is non-corrosive.

5. The disc drive of claim 4, wherein the constrained gas within the disc drive is selected from the group consisting essentially of argon, nitrogen, hydrogen, helium, fluorocarbon and hydrocarbon.

6. The disc drive of claim 4, further comprising an oxygen scavenger material selected from the group consisting essentially of magnesium and copper.

7. The disc drive of claim 1, wherein the diaphragm is a polyester film.

8. The disc drive of claim 7, wherein the diaphragm has a thin metal coating.

9. The disc drive of claim 7, wherein the diaphragm is Mylar™.

10. The disc drive of claim 1, wherein the diaphragm is impermeable.

11. The disc drive of claim 1, further comprising:
a diaphragm chamber second portion, the second portion separated from the first portion by the flexible diaphragm; and
a second aperture in the second portion providing an air passage between the disc drive's internally constrained gas and the second portion.

12. The disc drive of claim 11 further comprising a top cover that includes a top stamping and a bottom stamping and, wherein the top and bottom stampings house the diaphragm chamber.

13. The disc drive of claim 12, wherein the first aperture is positioned through the first stamping and the second aperture is positioned through the second stamping.

14. A disc drive diaphragm chamber for responding to internal changes in gas volume in a hermetically sealed disc drive, the chamber comprising:
a constrained gas within the disc drive reducing the effects of corrosion product build-up within the disc drive;
a first portion positioned in the disc drive accommodating changes in the volume of the constrained gas;
a first aperture providing an air passage between the disc drive's external environment and the first portion; and
a diaphragm sealing the first portion from the constrained gas, wherein the diaphragm responds to volumetric changes in the disc drive's constrained gas.

15. The diaphragm chamber of claim 14, further comprising:
a second portion separated from the first portion by the diaphragm, the second portion including an aperture so that the second portion is in communication with the disc drive's constrained gas.

16. The diaphragm chamber of claim 14, wherein the constrained gas within the disc drive is non-corrosive.

17. The diaphragm chamber of claim 16, wherein the constrained gas within the disc drive is selected from the group consisting essentially of argon, nitrogen, hydrogen, helium, fluorocarbon and hydrocarbon.

18. The diaphragm chamber of claim 14, wherein the diaphragm is a polyester film.

19. The diaphragm chamber of claim 18, wherein the diaphragm has a thin metal coating.

20. A hermetically sealed disc drive assembly that is responsive to changes in gas volume, the disc drive assembly comprising:
a housing with a hermetic seal for constraining a gas inside the disc drive assembly; and
means responding to a change of temperature or pressure to adjust the constrained gas volume without breaking the hermetic seal.

* * * * *